(12) United States Patent
Chuang et al.

(10) Patent No.: US 9,708,437 B2
(45) Date of Patent: Jul. 18, 2017

(54) RESIN FORMULATIONS, RESIN POLYMERS AND COMPOSITE MATERIALS COMPRISING THE RESIN POLYMERS

(71) Applicant: INDUSTRIAL TECHNOLOGY RESEARCH INSTITUTE, Hsinchu (TW)

(72) Inventors: Kuei-Yi Chuang, Tainan (TW); Feng-Po Tseng, Taoyuan (TW); Kuo-Chan Chiou, Tainan (TW); Lu-Shih Liao, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/805,094

(22) Filed: Jul. 21, 2015

(65) Prior Publication Data

US 2016/0145373 A1    May 26, 2016

(30) Foreign Application Priority Data

Nov. 21, 2014 (TW) .............................. 103140382 A

(51) Int. Cl.

| C08G 18/38 | (2006.01) |
| C08K 3/22 | (2006.01) |
| C08G 18/34 | (2006.01) |
| C08K 3/36 | (2006.01) |
| C08J 5/04 | (2006.01) |
| C08G 18/76 | (2006.01) |

(52) U.S. Cl.
CPC ....... *C08G 18/3846* (2013.01); *C08G 18/345* (2013.01); *C08G 18/7671* (2013.01); *C08G 18/7678* (2013.01); *C08G 18/7685* (2013.01); *C08J 5/04* (2013.01); *C08K 3/22* (2013.01); *C08K 3/36* (2013.01); *C08K 2003/2227* (2013.01)

(58) Field of Classification Search
CPC .............. C08G 18/345; C08G 18/3846; C08G 18/7671; C08G 18/7678; C08G 18/7685; C08J 5/04; C08K 3/22; C08K 3/36; C08K 2003/2227; C08L 75/04; Y10T 428/31681; Y10T 428/31721; Y10T 428/31725
USPC ................... 428/473.5, 474.4; 528/67, 83, 85
See application file for complete search history.

(56) References Cited

U.S. PATENT DOCUMENTS

| 4,401,499 | A | 8/1983 | Kaneko et al. |
| 4,451,621 | A | 5/1984 | Yonezawa et al. |
| 5,602,213 | A | 2/1997 | Hsu et al. |
| 6,225,404 | B1 | 5/2001 | Sorensen et al. |
| 6,774,172 | B1 | 8/2004 | Nakamura |
| 6,809,130 | B2 | 10/2004 | Chiou et al. |
| 7,858,197 | B2 | 12/2010 | Ahn et al. |
| 8,039,537 | B2 | 10/2011 | Tseng et al. |
| 8,084,135 | B2 | 12/2011 | Ahn et al. |
| 8,278,820 | B2 | 10/2012 | Yu et al. |

| 2007/0088134 | A1 | 4/2007 | Suzuki et al. |
| 2009/0176161 | A1 | 7/2009 | Sanchez et al. |
| 2011/0221331 | A1 | 9/2011 | Yu et al. |
| 2013/0065074 | A1 | 3/2013 | Chiou et al. |
| 2013/0309489 | A1* | 11/2013 | Murakami .............. C08L 79/08 428/355 CN |
| 2014/0326487 | A1* | 11/2014 | Ozeki .................... H05K 3/386 174/254 |

FOREIGN PATENT DOCUMENTS

| CN | 101747596 A | 6/2010 |
| CN | 102002317 A | 4/2011 |

(Continued)

OTHER PUBLICATIONS

Chuang et al., "Introduction the dielectric insulating material for IC substrate", Materialsnet, 2013, pp. 104-110.

(Continued)

*Primary Examiner* — Thao T Tran
(74) *Attorney, Agent, or Firm* — Birch, Stewart, Kolasch & Birch, LLP

(57) ABSTRACT

A resin formulation is provided. The resin formulation includes carboxy anhydride at 100 parts by weight, first diisocyanate having the following formula (I) at 20-90 parts by weight, second diisocyanate having the following formulas (II), (III) or a combination thereof at 45-103 parts by weight, and bismaleimide (BMI) at 50-200 parts by weight. A resin polymer and a composite material including the resin polymer are also provided.

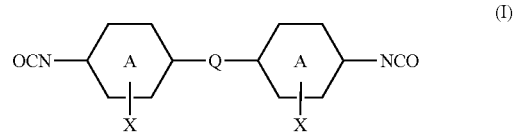

(I)

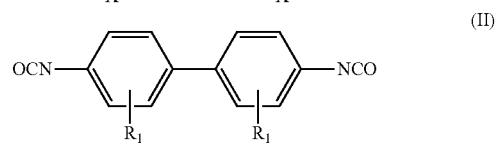

(II)

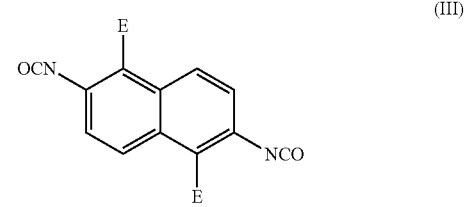

(III)

In formulas (I), (II) and (III), A includes benzene or cyclohexane, Q includes C1-C12 alkylene, —O—, —S— or —SO$_2$—, X includes —H, —CH$_3$ or —CH$_2$CH$_3$, R$_1$ includes —H, —CH$_3$ or —CH$_2$CH$_3$, and E includes —H, —CH$_3$ or —CH$_2$CH$_3$.

20 Claims, No Drawings

(56) References Cited

FOREIGN PATENT DOCUMENTS

| | | |
|---|---|---|
| EP | 0 023 610 B1 | 2/1984 |
| EP | 2 113 524 A1 | 11/2009 |
| EP | 2 395 059 B1 | 9/2014 |
| JP | 2-218774 A | 8/1990 |
| JP | 6-5123 A | 1/1994 |
| JP | 57-2317 A | 1/1994 |
| JP | 6-313109 A | 11/1994 |
| TW | 201235411 A1 | 9/2012 |
| TW | 201311767 A1 | 3/2013 |
| TW | I398465 B1 | 6/2013 |
| TW | 201336885 A1 | 9/2013 |
| TW | I406932 B1 | 9/2013 |
| WO | WO 2013/077397 A1 | 5/2013 |

OTHER PUBLICATIONS

Grenier-Loustalot et al., "Influence of steric hindrance on the reactivity and kinetics of molten-state radical polymerization of binary bismaleimide-diamine systems", Polymer, vol. 39, No. 10, 1998, pp. 1799-1814.

Liao et al., "The Technology Trends of Highly Thermal Resisted Halogen-free PCB Materials", Materialsnet, vol. 249, Sep. 2007, pp. 116-123.

Numata et al., "Thermal expansion coefficients and moduli of uniaxially stretched polyimide films with rigid and flexible molecular chains", Polymer, vol. 30, Jun. 1989, pp. 1170-1174.

Office Action for Taiwanese Application No. 103140382, issued on Jun. 22, 2015.

Weinhold et al., "How advanced low coefficient of thermal expansion (CTE) laminates and prepregs can improve the reliability of printed circuit boards (PCBs)", Circuit World, vol. 29, No. 1, 2002, pp. 24-31.

Japanese Office Action for Appl. No. 2015-225913 dated Oct. 18, 2016 (w/ English translation).

\* cited by examiner

RESIN FORMULATIONS, RESIN POLYMERS AND COMPOSITE MATERIALS COMPRISING THE RESIN POLYMERS

CROSS REFERENCE TO RELATED APPLICATIONS

This Application claims the priority of Taiwan Patent Application No. 103140382, filed on Nov. 21, 2014, the entirety of which is incorporated by reference herein.

TECHNICAL FIELD

The technical field relates to a resin formulation with a highly thermal resistance and a low coefficient of thermal expansion.

BACKGROUND

In recent years, the wiring of printed circuit boards (PCBs) has gradually progressed towards high-density integration and thinning. With the thinning of the substrate, under high-temperature processes, the substrate is easier to warp. At this time, it is preferred that the coefficient of thermal expansion of resin used in an insulating layer is similar to that of the wafer. However, the coefficient of thermal expansion of general insulating resin is high. Therefore, development of insulating resin with a low coefficient of thermal expansion is desirable.

SUMMARY

In accordance with one embodiment of the disclosure, a resin formulation is provided. The resin formulation comprises 100 parts by weight of carboxy anhydride; 20-90 parts by weight of first diisocyanate having the following formula (I); 45-103 parts by weight of second diisocyanate having the following formulas (II), (III) or a combination thereof; and 50-200 parts by weight of bismaleimide (BMI), wherein formulas (I), (II) and (III) are as follows.

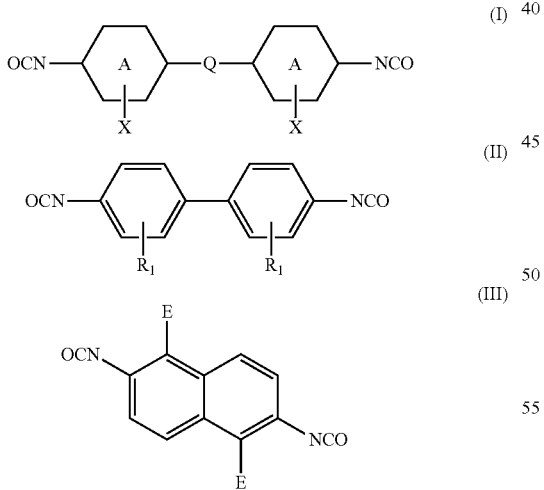

In formulas (I), (II) and (III), A is independently benzene or cyclohexane, Q is C1-C12 alkylene, —O—, —S— or —SO$_2$—, X is independently —H, —CH$_3$ or —CH$_2$CH$_3$, R$_1$ is independently —H, —CH$_3$ or —CH$_2$CH$_3$, and E is independently —H, —CH$_3$ or —CH$_2$CH$_3$.

In accordance with one embodiment of the disclosure, a resin polymer is provided. The resin polymer is prepared by the following method, comprising: mixing carboxy anhydride, first diisocyanate, second diisocyanate and bismaleimide (BMI) to proceed with a polymerization reaction to prepare a resin polymer, wherein the first diisocyanate has the disclosed formula (I) and the second diisocyanate has the disclosed formulas (II), (III) or a combination thereof, wherein the carboxy anhydride is at 100 parts by weight, the first diisocyanate is at 20-90 parts by weight, the second diisocyanate is at 45-103 parts by weight, and the bismaleimide (BMI) is at 50-200 parts by weight.

In accordance with one embodiment of the disclosure, a composite material is provided. The composite material comprises a substrate and the disclosed resin polymer formed on the substrate.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are shown schematically in order to simplify the drawing.

In accordance with one embodiment of the disclosure, a resin formulation is provided. The resin formulation comprises carboxy anhydride at 100 parts by weight; first diisocyanate having the following formula (I) at 20-90 parts by weight; second diisocyanate having the following formulas (II), (III) or a combination thereof at 45-103 parts by weight; and bismaleimide (BMI) at 50-200 parts by weight. Formulas (I), (II) and (III) are shown below.

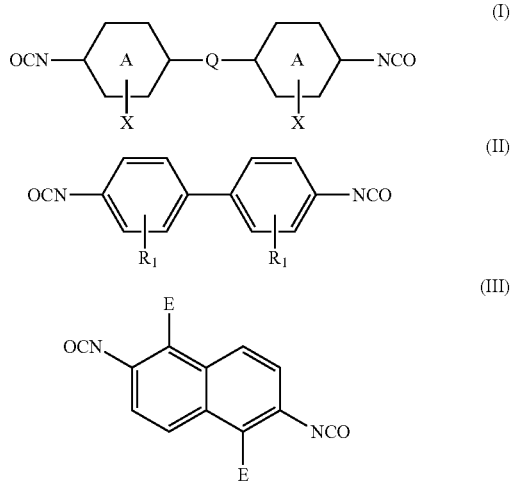

In formulas (I), (II) and (III), A may be independently benzene or cyclohexane. Q may be C1-C12 alkylene (for example, —CH$_2$—, —(CH$_2$)$_2$—, —(CH$_2$)$_6$—, —(CH$_2$)$_8$—, —(CH$_2$)$_{12}$— or —C(CH$_3$)$_2$—), —O—, —S— or —SO$_2$—. X may be independently —H, —CH$_3$ or —CH$_2$CH$_3$. R$_1$ may be independently —H, —CH$_3$ or —CH$_2$CH$_3$. E may be independently —H, —CH$_3$ or —CH$_2$CH$_3$.

The carboxy anhydride may have the following formula.

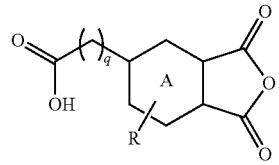

In the formula, A may be benzene or cyclohexane. R may be —H, —CH$_3$ or —COOH. q ranges from about 0 to 8. The carboxy anhydride added in the disclosed resin formulation may be trimellitic anhydride (TMA), c-TMA (cyclohexane-1,2,4-tricarboxylic acid-1,2-anhydride) or a combination thereof.

Specifically, in the disclosed resin formulation, the first diisocyanate having formula (I) and the second diisocyanate having formula (II) have a weight ratio of about 25-75:55-115 or 30-65:65-105.

The first diisocyanate having formula (I) and the second diisocyanate having formula (III) have a weight ratio of about 25-75:40-100 or 30-65:50-90.

The first diisocyanate having formula (I), the second diisocyanate having formula (II) and the second diisocyanate having formula (III) have a weight ratio of about 80-300:100:10-1000 or 150-200:100:50-600.

The bismaleimide (BMI) may have the following formulas.

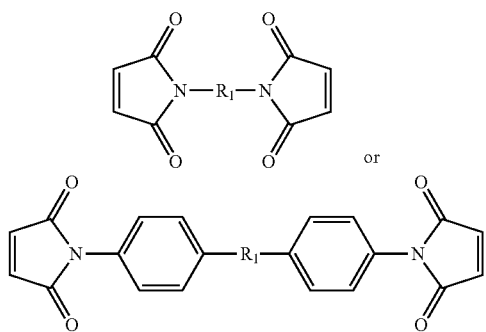

In the formulas, R$_1$ may be independently —(CH$_2$)$_2$—, —(CH$_2$)$_6$—, —(CH$_2$)$_8$—, —(CH$_2$)$_{12}$—, —CH$_2$—C(CH$_3$)$_2$—CH$_2$—CH(CH$_3$)—CH$_2$—CH$_2$—,

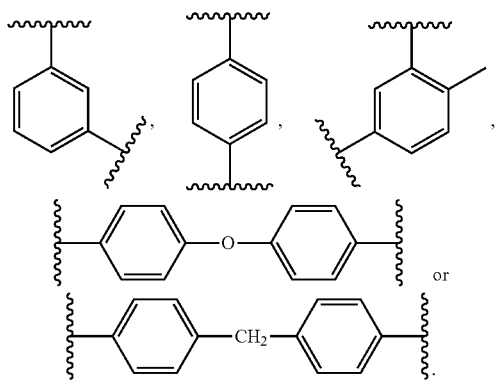

In one embodiment, in the disclosed resin formulation, the first diisocyanate is at 25-70 parts by weight, the second diisocyanate is at 50-103 parts by weight, and the bismaleimide (BMI) is at 80-180 parts by weight.

The disclosed resin formulation may further comprise inorganic powders at 50-200 parts by weight. The inorganic powders added in the disclosed resin formulation may comprise silicon oxide (for example, silicon dioxide), aluminum oxide (for example, aluminum trioxide), magnesium oxide or a combination thereof.

The solvent added in the disclosed resin formulation is properly selected in accordance with the used diisocyanates and bismaleimide (BMI). The solvent may be acetone, methyl ethyl ketone, 1-methoxy-2-propanol, 1,2-propanediol monomethyl ether acetate, toluene, xylene, dimethyl formamide (DMF), dimethyl acetamide (DMAc), N-methyl-2-pyrrolidone (NMP), dimethyl sulfoxide (DMSO) or a combination thereof, but it is not limited thereto.

In one embodiment, the carboxy anhydride, the first diisocyanate, the second diisocyanate and solvent are mixed and heated to proceed with a polymerization reaction to form a prepolymer. The reaction temperature ranges from about 80° C. to 150° C., for example, ranging from about 100° C. to 130° C. The reaction time ranges from about 0.5 hour to 6 hours, for example, ranging from about 1.5 hours to 3.5 hours.

In accordance with one embodiment of the disclosure, a resin prepolymer is provided. The resin prepolymer has the following formula.

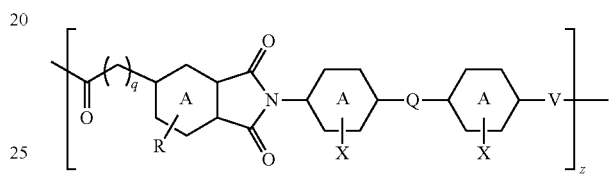

In the formula, A may be independently benzene or cyclohexane. R may be —H, —CH$_3$ or —COOH. X may be independently —H, —CH$_3$ or —CH$_2$CH$_3$. Q may be C1-C12 alkylene (for example, —CH$_2$—, —(CH$_2$)$_2$—, —(CH$_2$)$_6$—, —(CH$_2$)$_8$—, —(CH$_2$)$_{12}$— or —C(CH$_3$)$_2$—), —O—, —S— or —SO$_2$—. V may be —NH—. Additionally, q ranges from about 0 to 8, and z ranges from about 1 to 20,000.

In accordance with another embodiment of the disclosure, a resin prepolymer is provided. The resin prepolymer has the following formula.

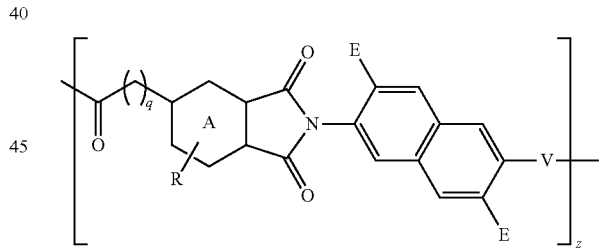

In the formula, A may be benzene or cyclohexane. R may be —H, —CH$_3$ or —COOH. E may be independently —H, —CH$_3$ or —CH$_2$CH$_3$. V may be —NH—. Additionally, q ranges from about 0 to 8, and z ranges from about 1 to 20,000.

In accordance with one embodiment of the disclosure, a resin polymer is provided. The resin polymer is prepared by the following method, comprising: mixing carboxy anhydride, first diisocyanate, second diisocyanate and bismaleimide (BMI) to proceed with a polymerization reaction to prepare a resin polymer. The first diisocyanate has the following formula (I) and the second diisocyanate has the following formulas (II), (III) or a combination thereof. The carboxy anhydride is at 100 parts by weight, the first diisocyanate is at 20-90 parts by weight, the second diisocyanate is at 45-103 parts by weight, and the bismaleimide (BMI) is at 50-200 parts by weight.

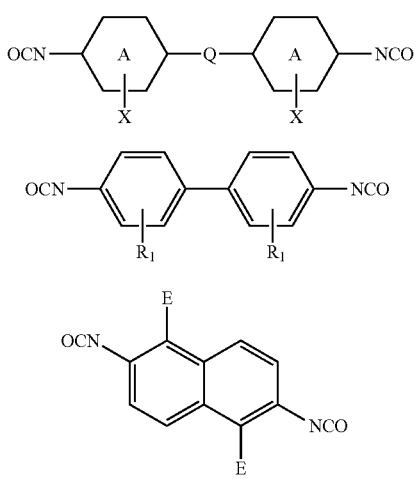

In formulas (I), (II) and (III), A may be independently benzene or cyclohexane. Q may be comprise C1-C12 alkylene (for example, —CH$_2$—, —(CH$_2$)$_2$—, —(CH$_2$)$_6$—, —(CH$_2$)$_8$—, —(CH$_2$)$_{12}$— or —C(CH$_3$)$_2$—), —O—, —S— or —SO$_2$—. X may be independently —H, —CH$_3$ or —CH$_2$CH$_3$. R$_1$ may be independently —H, —CH$_3$ or —CH$_2$CH$_3$. E may be independently —H, —CH$_3$ or —CH$_2$CH$_3$.

Specifically, in the mixing step of the disclosed method for preparing the resin polymer, the first diisocyanate having formula (I) and the second diisocyanate having formula (II) have a weight ratio of about 25-75:55-115 or 30-65:65-105.

The first diisocyanate having formula (I) and the second diisocyanate having formula (III) have a weight ratio of about 25-75:40-100 or 30-65:50-90.

The first diisocyanate having formula (I), the second diisocyanate having formula (II) and the second diisocyanate having formula (III) have a weight ratio of about 80-300:100:10-1000 or 150-200:100:50-600.

In accordance with one embodiment of the disclosure, a composite material is provided. The composite material comprises a substrate and the disclosed resin polymer formed on the substrate.

The substrate may comprise fiber or metal.

In the disclosure, carboxy anhydride, methylene diphenyl isocyanate (MDI) and symmetrical/rigid diisocyanate (for example, at least one of 1,5-naphthalene diisocyanate (NDI) or bitolylene diisocyanate (TODI)) are first reacted to form polyamide imide (PAI) resin with a low coefficient of thermal expansion and high reactivity. Bismaleimide (BMI) with a high thermal/flame resistance is then conducted to the resin so that the resin material with a low coefficient of thermal expansion is compatible with impregnating and thermal-laminating processes. Additionally, the disclosed formulation composition of the composite material is capable of applying to IC substrates and multi-layer circuit boards, meeting the requirement of low substrate warpage.

EXAMPLES

Example 1

Preparation of the Composite Material (1)(the Composition of the Raw Material Formulation: TMA/MDI/TODI/BMI)

100 g of trimellitic anhydride (TMA, Fu-Pao Chemical Co.), 69 g of bitolylene diisocyanate (TODI, CHAR-DENG agent), 65 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 156 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 1.

Example 2

Preparation of the Composite Material (2)(the Composition of the Raw Material Formulation: TMA/MDI/TODI/BMI)

100 g of trimellitic anhydride (TMA, Fu-Pao Chemical Co.), 103 g of bitolylene diisocyanate (TODI, CHAR-DENG agent), 32.6 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 157 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 1.

Example 3

Preparation of the Composite Material (3)(the Composition of the Raw Material Formulation: TMA/MDI/NDI/BMI)

100 g of trimellitic anhydride (TMA, Fu-Pao Chemical Co.), 54.7 g of 1,5-naphthalene diisocyanate (NDI, MAO-SHUN agent), 65 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 160 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 1.

Example 4

Preparation of the Composite Material (4)(the Composition of the Raw Material Formulation: TMA/MDI/NDI/BMI)

100 g of trimellitic anhydride (TMA, Fu-Pao Chemical Co.), 82 g of 1,5-naphthalene diisocyanate (NDI, MAO- SHUN agent), 32 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 156 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 1.

Example 5

Preparation of the Composite Material (5)(the Composition of the Raw Material Formulation: TMA/MDI/TODI/BMI/Al$_2$O$_3$/SiO$_2$)

100 g of trimellitic anhydride (TMA, Fu-Pao Chemical Co.), 103 g of bitolylene diisocyanate (TODI, CHARDENG agent), 32.6 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 157 g of bismaleimide (BMI, KI Chemical Co.) was added to the solution and reacted with stirring at 90-135° C. 85 g of Al$_2$O$_3$ (1-2 µm, SHOWA) and 85 g of SiO$_2$ (<5 µm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 1.

Example 6

Preparation of the Composite Material (6)(the Composition of the Raw Material Formulation: TMA/MDI/NDI/BMI/Al$_2$O$_3$/SiO$_2$)

100 g of trimellitic anhydride (TMA, Fu-Pao Chemical Co.), 82 g of 1,5-naphthalene diisocyanate (NDI, MAO-SHUN agent), 32 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 156 g of bismaleimide (BMI, KI Chemical Co.) was added to the solution and reacted with stirring at 90-135° C. 80 g of Al$_2$O$_3$ (1-2 µm, SHOWA) and 80 g of SiO$_2$ (<5 µm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 1.

TABLE 1

| Examples | | 1 | 2 | 3 | 4 | 5 | 6 |
|---|---|---|---|---|---|---|---|
| Composite material composition | MDI (g) | 65 | 32.6 | 65 | 32 | 32.6 | 32 |
| | TODI (g) | 69 | 103 | — | — | 103 | — |
| | NDI (g) | — | — | 54.7 | 82 | — | 82 |
| | TMA (g) | 100 | 100 | 100 | 100 | 100 | 100 |
| | BMI (g) | 156 | 157 | 160 | 156 | 157 | 156 |
| | Al$_2$O$_3$ (g) | — | — | — | — | 85 | 80 |
| | SiO$_2$ (g) | — | — | — | — | 85 | 80 |
| Physical/material properties | Tg (° C.) | 265 | 278 | 275 | 292 | 258 | 261 |
| | Td$_{5\%}$ (° C.) | 415 | 438 | 428 | 426 | 474 | 443 |
| | xy-CTE (ppm/° C.) | 30 | 27 | 28 | 25 | 11 | 8 |
| | z-CTE (ppm/° C.) | 48 | 40 | 46 | 37 | 32 | 16 |
| | UL-94 | V0 | V0 | V0 | V0 | V0 | V0 |

Tg: glass transition temperature
Td$_{5\%}$: decomposition temperature

Example 7

Preparation of the Composite Material (7)(the Composition of the Raw Material Formulation: TMA/MDI/NDI/BMI/Al$_2$O$_3$/SiO$_2$)

100 g of trimellitic anhydride (TMA, Fu-Pao Chemical Co.), 82 g of 1,5-naphthalene diisocyanate (NDI, MAO-SHUN agent), 32 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 156 g of bismaleimide (BMI, KI Chemical Co.) was added to the solution and reacted with stirring at 90-135° C. 46 g of Al$_2$O$_3$ (1-2 µm, SHOWA) and 46.5 g of SiO$_2$ (<5 µm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 2.

Example 8

Preparation of the Composite Material (8)(the Composition of the Raw Material Formulation: TMA/MDI/NDI/BMI/Al$_2$O$_3$/SiO$_2$)

100 g of trimellitic anhydride (TMA, Fu-Pao Chemical Co.), 82 g of 1,5-naphthalene diisocyanate (NDI, MAO-SHUN agent), 32 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 94 g of bismaleimide (BMI, KI Chemical Co.) was added to the solution and reacted with stirring at 90-135° C. 65 g of Al$_2$O$_3$ (1-2 µm, SHOWA) and 66 g of SiO$_2$ (<5 µm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 2.

Example 9

Preparation of the Composite Material (9)(the Composition of the Raw Material Formulation: TMA/MDI/TODI/NDI/BMI)

100 g of trimellitic anhydride (TMA, Fu-Pao Chemical Co.), 34.3 g of bitolylene diisocyanate (TODI, CHARDENG agent), 27.3 g of 1,5-naphthalene diisocyanate (NDI, MAO-SHUN agent), 65 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 156 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 2.

Example 10

Preparation of the Composite Material (10)(the Composition of the Raw Material Formulation: TMA/MDI/TODI/NDI/BMI)

100 g of trimellitic anhydride (TMA, Fu-Pao Chemical Co.), 13.7 g of bitolylene diisocyanate (TODI, CHARDENG agent), 76.5 g of 1,5-naphthalene diisocyanate (NDI, MAO-SHUN agent), 26 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 156 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 2.

Example 11

Preparation of the Composite Material (11)(the Composition of the Raw Material Formulation: TMA/MDI/TODI/NDI/BMI/$Al_2O_3$/$SiO_2$)

100 g of trimellitic anhydride (TMA, Fu-Pao Chemical Co.), 34.3 g of bitolylene diisocyanate (TODI, CHARDENG agent), 27.3 g of 1,5-naphthalene diisocyanate (NDI, MAO-SHUN agent), 65 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 156 g of bismaleimide (BMI, KI Chemical Co.) was added to the solution and reacted with stirring at 90-135° C. 80 g of $Al_2O_3$ (1-2 μm, SHOWA) and 80 g of $SiO_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 2.

Example 12

Preparation of the Composite Material (12)(the Composition of the Raw Material Formulation: TMA/MDI/TODI/NDI/BMI/$Al_2O_3$/$SiO_2$)

100 g of trimellitic anhydride (TMA, Fu-Pao Chemical Co.), 13.7 g of bitolylene diisocyanate (TODI, CHARDENG agent), 76.5 g of 1,5-naphthalene diisocyanate (NDI, MAO-SHUN agent), 26 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 148 g of bismaleimide (BMI, KI Chemical Co.) was added to the solution and reacted with stirring at 90-135° C. 79 g of $Al_2O_3$ (1-2 μm, SHOWA) and 79 g of $SiO_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material with a high thermal resistance and a low coefficient of thermal expansion was thus prepared. The composition and physical/material properties of the composite material are shown in Table 2.

TABLE 2

| Examples | | 7 | 8 | 9 | 10 | 11 | 12 |
|---|---|---|---|---|---|---|---|
| Composite material composition | MDI (g) | 32 | 32 | 65 | 26 | 65 | 26 |
| | TODI (g) | — | — | 34.3 | 13.7 | 34.3 | 13.7 |
| | NDI (g) | 82 | 82 | 27.3 | 76.5 | 27.3 | 76.5 |
| | TMA (g) | 100 | 100 | 100 | 100 | 100 | 100 |
| | BMI (g) | 156 | 94 | 156 | 156 | 156 | 156 |
| | $Al_2O_3$ (g) | 46 | 65 | — | — | 80 | 79 |
| | $SiO_2$ (g) | 46.5 | 66 | — | — | 80 | 79 |
| Physical/material properties | Tg (° C.) | 268 | 255 | 268 | 287 | 263 | 270 |
| | $Td_{5\%}$ (° C.) | 440 | 420 | 425 | 430 | 451 | 455 |
| | xy-CTE (ppm/° C.) | 11 | 12 | 30 | 26 | 18 | 11 |
| | z-CTE (ppm/° C.) | 25 | 20 | 47 | 38 | 35 | 20 |
| | UL-94 | V0 | V0 | V0 | V0 | V0 | V0 |

Comparative Example 1

Preparation of the Composite Material (1)(the Composition of the Raw Material Formulation: TMA/MDI/BMI)

50 g of trimellitic anhydride (TMA, Fu-Pao Chemical Co.), 65 g of methylene diphenyl diisocyanate (MDI, Fu- Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 172 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 3.

Comparative Example 2

Preparation of the Composite Material (2)(the Composition of the Raw Material Formulation: TMA/MDI/NDI/BMI)

50 g of trimellitic anhydride (TMA, Fu-Pao Chemical Co.), 11 g of 1,5-naphthalene diisocyanate (NDI, MAO-SHUN agent), 52 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 3.

Comparative Example 3

Preparation of the Composite Material (3)(the Composition of the Raw Material Formulation: TMA/MDI/NDI/BMI/$Al_2O_3$/$SiO_2$)

50 g of trimellitic anhydride (TMA, Fu-Pao Chemical Co.), 11 g of 1,5-naphthalene diisocyanate (NDI, MAO-SHUN agent), 52 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. 40 g of $Al_2O_3$ (1-2 μm, SHOWA) and 40 g of $SiO_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 3.

Comparative Example 4

Preparation of the Composite Material (4)(the Composition of the Raw Material Formulation: TMA/MDI/BMI/$Al_2O_3$/$SiO_2$)

50 g of trimellitic anhydride (TMA, Fu-Pao Chemical Co.), 65 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 172 g of bismaleimide (BMI, KI Chemical Co.) was added to the solution and reacted with stirring at 90-135° C. 86.3 g of $Al_2O_3$ (1-2 μm, SHOWA) and 53.6 g of $SiO_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 3.

Comparative Example 5

Preparation of the Composite Material (5)(the Composition of the Raw Material Formulation: TMA/MDI/NDI/BMI)

50 g of trimellitic anhydride (TMA, Fu-Pao Chemical Co.), 52 g of 1,5-naphthalene diisocyanate (NDI, MAO-SHUN agent), 3.2 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 3.

Comparative Example 6

Preparation of the Composite Material (6)(the Composition of the Raw Material Formulation: TMA/MDI/NDI/BMI/$Al_2O_3$/$SiO_2$)

50 g of trimellitic anhydride (TMA, Fu-Pao Chemical Co.), 52 g of 1,5-naphthalene diisocyanate (NDI, MAO-SHUN agent), 3.2 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. 39 g of $Al_2O_3$ (1-2 μm, SHOWA) and 40 g of $SiO_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 3.

TABLE 3

| Comparative Examples | | 1 | 2 | 3 | 4 | 5 | 6 |
|---|---|---|---|---|---|---|---|
| Composite material composition | MDI (g) | 65 | 52 | 52 | 65 | 3.2 | 3.2 |
| | TODI (g) | — | — | — | — | — | — |
| | NDI (g) | — | 11 | 11 | — | 52 | 52 |
| | TMA (g) | 50 | 50 | 50 | 50 | 50 | 50 |
| | BMI (g) | 172 | 80 | 80 | 172 | 80 | 80 |
| | $Al_2O_3$ (g) | — | — | 40 | 54 | — | 39 |
| | $SiO_2$ (g) | — | — | 40 | 86 | — | 40 |

TABLE 3-continued

| Comparative Examples | | 1 | 2 | 3 | 4 | 5 | 6 |
|---|---|---|---|---|---|---|---|
| Physical/ material properties | Tg (° C.) | 295 | 260 | 272 | 280 | N.D. | N.D. |
| | Td$_{5\%}$ (° C.) | 435 | 408 | 415 | 425 | 415 | 425 |
| | xy-CTE (ppm/° C.) | 45 | 41 | 35 | 38 | N.D. | N.D. |
| | z-CTE (ppm/° C.) | 65 | 61 | 51 | 54 | N.D. | N.D. |
| | UL-94 | V0 | V0 | V0 | V0 | V1 | V1 |

In Comparative Examples 5 and 6, after impregnating and laminating, the prepregs are unable to tightly adhere with each other so some physical/material properties cannot be measured (N.D.).

Comparative Example 7

Preparation of the Composite Material (7)(the Composition of the Raw Material Formulation: TMA/MDI/TODI/BMI)

50 g of trimellitic anhydride (TMA, Fu-Pao Chemical Co.), 20.6 g of bitolylene diisocyanate (TODI, CHAR-DENG agent), 45.5 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 4.

Comparative Example 8

Preparation of the Composite Material (8)(the Composition of the Raw Material Formulation: TMA/MDI/TODI/BMI/Al$_2$O$_3$/SiO$_2$)

50 g of trimellitic anhydride (TMA, Fu-Pao Chemical Co.), 20.6 g of bitolylene diisocyanate (TODI, CHAR-DENG agent), 45.5 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. 41 g of Al$_2$O$_3$ (1-2 μm, SHOWA) and 42 g of SiO$_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 4.

Comparative Example 9

Preparation of the Composite Material (9)(the Composition of the Raw Material Formulation: TMA/MDI/TODI/BMI)

50 g of trimellitic anhydride (TMA, Fu-Pao Chemical Co.), 65 g of bitolylene diisocyanate (TODI, CHAR-DENG agent), 3.2 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 4.

Comparative Example 10

Preparation of the Composite Material (10)(the Composition of the Raw Material Formulation: TMA/MDI/TODI/BMI/Al$_2$O$_3$/SiO$_2$)

50 g of trimellitic anhydride (TMA, Fu-Pao Chemical Co.), 65 g of bitolylene diisocyanate (TODI, CHAR-DENG agent), 3.2 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. 41 g of Al$_2$O$_3$ (1-2 μm, SHOWA) and 42 g of SiO$_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 4.

TABLE 4

| Comparative Examples | | 7 | 8 | 9 | 10 |
|---|---|---|---|---|---|
| Composite material composition | MDI (g) | 45.5 | 45.5 | 3.2 | 3.2 |
| | TODI (g) | 20.6 | 20.6 | 65 | 65 |
| | NDI (g) | — | — | — | — |
| | TMA (g) | 50 | 50 | 50 | 50 |
| | BMI (g) | 80 | 80 | 80 | 80 |
| | Al$_2$O$_3$ (g) | — | 41 | — | 41 |
| | SiO$_2$ (g) | — | 42 | — | 42 |
| Physical/ material properties | Tg (° C.) | 278 | 265 | N.D. | N.D. |
| | Td$_{5\%}$ (° C.) | 420 | 430 | 410 | 415 |
| | xy-CTE (ppm/° C.) | 43 | 38 | N.D. | N.D. |
| | z-CTE (ppm/° C.) | 63 | 57 | N.D. | N.D. |
| | UL-94 | V0 | V0 | V1 | V1 |

In Comparative Examples 9 and 10, after impregnating and laminating, the prepregs are unable to tightly adhere with each other so some physical/material properties cannot be measured (N.D.).

Comparative Example 11

Preparation of the Composite Material (11)(the Composition of the Raw Material Formulation: TMA/MDI/TODI/NDI/BMI)

50 g of trimellitic anhydride (TMA, Fu-Pao Chemical Co.), 6.9 g of bitolylene diisocyanate (TODI, CHAR-DENG agent), 10.9 g of 1,5-naphthalene diisocyanate (NDI, MAO-SHUN agent), 45.5 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 5.

Comparative Example 12

Preparation of the Composite Material (12)(the Composition of the Raw Material Formulation: TMA/MDI/TODI/NDI/BMI/Al$_2$O$_3$/SiO$_2$)

50 g of trimellitic anhydride (TMA, Fu-Pao Chemical Co.), 6.9 g of bitolylene diisocyanate (TODI, CHAR-DENG agent), 10.9 g of 1,5-naphthalene diisocyanate (NDI, MAO-SHUN agent), 45.5 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. 40 g of Al$_2$O$_3$ (1-2 μm, SHOWA) and 41 g of SiO$_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 5.

Comparative Example 13

Preparation of the Composite Material (13)(the Composition of the Raw Material Formulation: TMA/MDI/TODI/NDI/BMI)

50 g of trimellitic anhydride (TMA, Fu-Pao Chemical Co.), 3.4 g of bitolylene diisocyanate (TODI, CHAR-DENG agent), 49.2 g of 1,5-naphthalene diisocyanate (NDI, MAO-SHUN agent), 3.2 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. to prepare formulated varnish. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 5.

Comparative Example 14

Preparation of the Composite Material (14)(the Composition of the Raw Material Formulation: TMA/MDI/TODI/NDI/BMI/Al$_2$O$_3$/SiO$_2$)

50 g of trimellitic anhydride (TMA, Fu-Pao Chemical Co.), 3.4 g of bitolylene diisocyanate (TODI, CHAR-DENG agent), 49.2 g of 1,5-naphthalene diisocyanate (NDI, MAO-SHUN agent), 3.2 g of methylene diphenyl diisocyanate (MDI, Fu-Pao Chemical Co.) and 550 g of N-Methyl-2-pyrrolidone (NMP, TEDIA Inc.) were added to a 1000-mL three-neck glass reactor and reacted with stirring using a two-impeller stirrer at 90-150° C. to form a solution. After the reaction was completed and the solution was cooled to room temperature, 80 g of bismaleimide (BMI, KI Chemical Co.) was added to the solution and reacted with stirring at 90-135° C. 39 g of Al$_2$O$_3$ (1-2 μm, SHOWA) and 40 g of SiO$_2$ (<5 μm, Tatsumori) were then added to the solution. After grinding and stirring, formulated varnish was prepared. A glass fiber cloth was then impregnated with the formulated varnish to form a prepreg, and then laminated prepregs, heated at 200° C. and pressurized for 3 hours. A composite material was thus prepared. The composition and physical/material properties of the composite material are shown in Table 5.

TABLE 5

| Comparative Examples | | 11 | 12 | 13 | 14 |
|---|---|---|---|---|---|
| Composite material composition | MDI (g) | 45.5 | 45.5 | 3.2 | 3.2 |
| | TODI (g) | 6.9 | 6.9 | 3.4 | 3.4 |
| | NDI (g) | 10.9 | 10.9 | 49.2 | 49.2 |
| | TMA (g) | 50 | 50 | 50 | 50 |
| | BMI (g) | 80 | 80 | 80 | 80 |
| | Al$_2$O$_3$ (g) | — | 40 | — | 39 |
| | SiO$_2$ (g) | — | 41 | — | 40 |
| Physical/material properties | Tg (° C.) | 278 | 268 | N.D. | N.D. |
| | Td$_{5\%}$ (° C.) | 438 | 435 | 418 | 421 |
| | xy-CTE (ppm/° C.) | 43 | 38 | N.D. | N.D. |
| | z-CTE (ppm/° C.) | 62 | 52 | N.D. | N.D. |
| | UL-94 | V0 | V0 | V1 | V1 |

In Comparative Examples 13 and 14, after impregnating and laminating, the prepregs are unable to tightly adhere with each other so some physical/material properties cannot be measured (N.D.).

The results of Tables 1-5 indicate that the disclosed composite material polymerized by adopting a specific resin formulation (including carboxy anhydride, at least two diisocyanates and bismaleimide (BMI)) and a specific ratio between the diisocyanates achieves the characteristics of low coefficient of thermal expansion (for example, xy-CTE ranging from 8 ppm/° C. to 30 ppm/° C.) and high glass transition temperature (for example, Tg>250° C.) under addition of a small amount (<30%) of inorganic fillers.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A resin formulation, comprising:

100 parts by weight of a carboxy anhydride;

20-90 parts by weight of a first diisocyanate having the following formula (I);

45-103 parts by weight of a second diisocyanate having the following formulae (II), (III) or a combination thereof; and 50-200 parts by weight of a bismaleimide (BMI), wherein formulae (I), (II) and (III) are as follows:

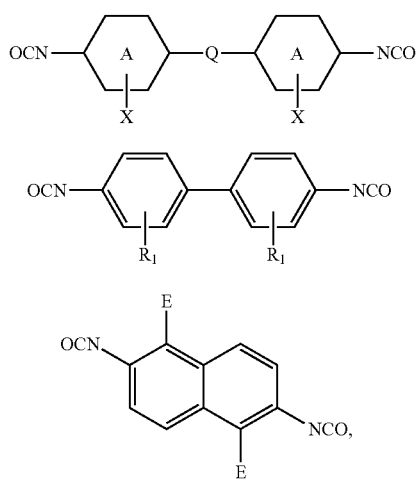

wherein A is independently benzene or cyclohexane, Q is C1-C12 alkylene, —O—, —S— or —SO$_2$—, X is independently —H, —CH$_3$ or —CH$_2$CH$_3$, R$_1$ is independently —H, —CH$_3$ or —CH$_2$CH$_3$, and E is independently —H, —CH$_3$ or —CH$_2$CH$_3$.

2. The resin formulation according to claim 1, wherein the carboxy anhydride has the following formula:

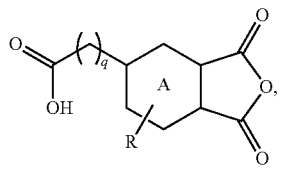

wherein A is benzene or cyclohexane, R is —H, —CH$_3$ or —COOH, and q ranges from 0 to 8.

3. The resin formulation according to claim 1, wherein the first diisocyanate having formula (I) and the second diisocyanate having formula (II) have a weight ratio of 25-75:55-115.

4. The resin formulation according to claim 1, wherein the first diisocyanate having formula (I) and the second diisocyanate having formula (II) have a weight ratio of 30-65:65-105.

5. The resin formulation according to claim 1, wherein the first diisocyanate having formula (I) and the second diisocyanate having formula (III) have a weight ratio of 25-75:40-100.

6. The resin formulation according to claim 1, wherein the first diisocyanate having formula (I) and the second diisocyanate having formula (III) have a weight ratio of 30-65:50-90.

7. The resin formulation according to claim 1, wherein the first diisocyanate having formula (I), the second diisocyanate having formula (II) and the second diisocyanate having formula (III) have a weight ratio of 80-300:100:10-1000.

8. The resin formulation according to claim 1, wherein the first diisocyanate having formula (I), the second diisocyanate having formula (II) and the second diisocyanate having formula (III) have a weight ratio of 150-200:100:50-600.

9. The resin formulation according to claim 1, wherein Q is —CH$_2$—, —(CH$_2$)$_2$—, —(CH$_2$)$_6$—, —(CH$_2$)$_8$—, —(CH$_2$)$_{12}$— or —C(CH$_3$)$_2$—.

10. The resin formulation according to claim 1, wherein the bismaleimide has the following formulae:

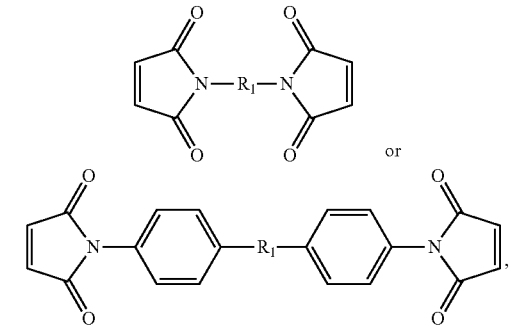

wherein R$_1$ is independently —(CH$_2$)$_2$—, —(CH$_2$)$_6$—, —(CH$_2$)$_8$—, —(CH$_2$)$_{12}$—, —CH$_2$—C(CH$_3$)$_2$—CH$_2$—CH(CH$_3$)—CH$_2$—CH$_2$—,

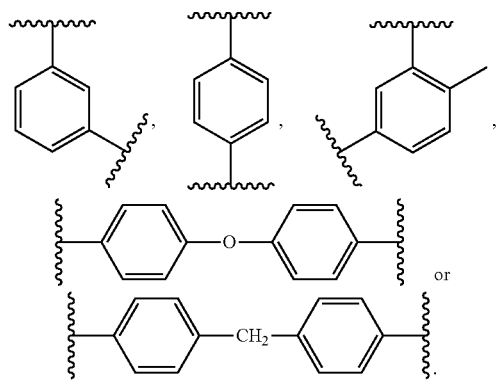

11. The resin formulation according to claim 1, further comprising inorganic powders at 50-200 parts by weight.

12. The resin formulation according to claim 1, wherein the resin formulation comprising:
25-70 parts by weight of the first diisocyanate;
50-103 parts by weight of the second diisocyanate; and
80-180 parts by weight of the bismaleimide (BMI).

13. The resin formulation according to claim 11, wherein the inorganic powders comprise silicon oxide, aluminum oxide, magnesium oxide or a combination thereof.

14. A resin polymer prepared by a method, comprising:
mixing a carboxy anhydride, a first diisocyanate, a second diisocyanate and a bismaleimide (BMI) and polymerizing the mixture to form the resin polymer, wherein the first diisocyanate has the following formula (I) and the second diisocyanate has the following formulae (II), (III) or a combination thereof, wherein the carboxy anhydride is at 100 parts by weight, the first diisocyanate is at 20-90 parts by weight, the second diisocyanate is at 45-103 parts by weight, and the bismaleimide (BMI) is at 50-200 parts by weight,

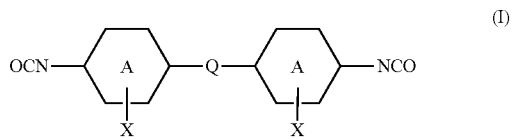

-continued

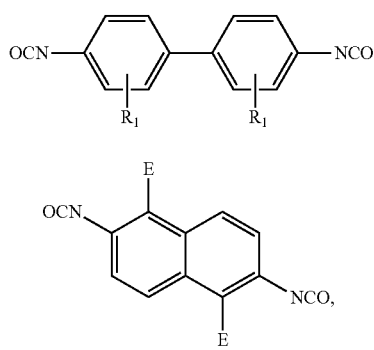

wherein A is independently benzene or cyclohexane, Q is C1-C12 alkylene, —O—, —S— or —SO$_2$—, X is independently —H, —CH$_3$ or —CH$_2$CH$_3$, R$_1$ is independently —H, —CH$_3$ or —CH$_2$CH$_3$, and E is independently —H, —CH$_3$ or —CH$_2$CH$_3$.

15. The resin polymer according to claim 14, wherein the first diisocyanate having formula (I) and the second diisocyanate having formula (II) have a weight ratio of 25-75:55-115.

16. The resin polymer according to claim 14, wherein the first diisocyanate having formula (I) and the second diisocyanate having formula (III) have a weight ratio of 25-75:40-100.

17. The resin polymer according to claim 14, wherein the first diisocyanate having formula (I), the second diisocyanate having formula (II) and the second diisocyanate having formula (III) have a weight ratio of 80-300:100:10-1000.

18. The resin polymer according to claim 14, wherein Q is —CH$_2$—, —(CH$_2$)$_2$—, —(CH$_2$)$_6$—, —(CH$_2$)$_8$—, —(CH$_2$)$_{12}$— or —C(CH$_3$)$_2$—.

19. A composite material, comprising:
    a substrate; and
    a resin polymer according to claim 14 formed on the substrate.

20. The composite material according to claim 19, wherein the substrate comprises fiber or metal.

* * * * *